Nov. 28, 1961    A. VAN DER PLAS    3,010,553
CLUTCH FOR FREEWHEEL CYCLE HUB
Filed Feb. 14, 1958
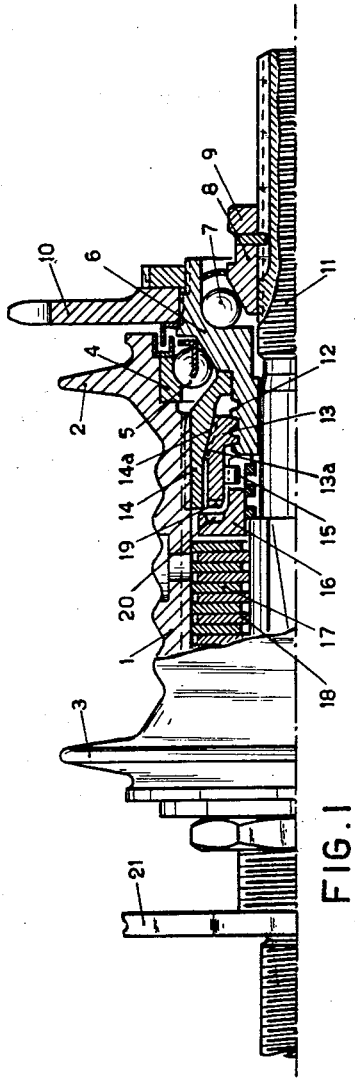
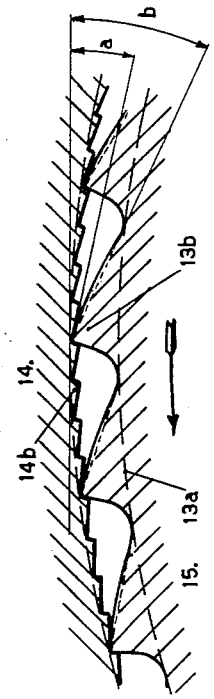
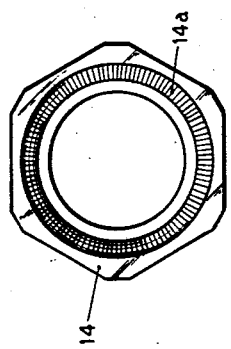
INVENTOR
ARIE VAN DER PLAS
BY United States Patent Office
3,010,553
Patented Nov. 28, 1961

3,010,553
CLUTCH FOR FREEWHEEL CYCLE HUB
Arie van der Plas, Brummen, Netherlands, assignor to Fijn-Mechanische Industrie Becker's Sons N.V., The Hague, Netherlands, a company of the Netherlands
Filed Feb. 14, 1958, Ser. No. 715,417
Claims priority, application Netherlands Feb. 22, 1957
5 Claims. (Cl. 192—64)

The invention relates to a freewheel hub, preferably a freewheel hub provided with an internally arranged back pedalling brake, for a cycle wheel comprising in combination a rotatable driving member, a screw thread provided on said member, two cooperating conical surfaces constituting together a cone-coupling, a wheel hub associated with one part of said coupling, a clutching member associated with the other part of said coupling and adapted to be axially reciprocated by said screw thread and thereby to establish and to disconnect the coupling between said driving member and said wheel hub, both conical surfaces of said cone-coupling being provided with saw-shaped teeth, of which the operative flanks have equal slopes.

A freewheel hub provided with a cone-coupling of the type referred to has already been disclosed in the British patent specification 202,319. In this coupling both cone-surfaces have teeth with equal pitches and with equally inclined operative flanks as well as equally inclined inoperative flanks. This coupling has the disadvantage that the oil, which is left between the conical surfaces approaching each other cannot escape quickly, so that there will always be left an oil film between the gently sloping inoperative flanks of said teeth. This results in that the teeth, when made relatively low, will engage each other only with very narrow marginal portions of their operative flanks, so that the specific pressure exerted by said teeth on each other will become too heavy, the teeth will slip and thereby round off their crest portions. Due to this fact the teeth of the said shape must be made relatively high, which has the disadvantage that not only the coupling will rattle in an inadmissible way when operated and during freewheeling thereby causing considerable wear, but also a relatively great axial movement of the movable cone-surface is required for the operation of the coupling.

The disadvantages of the mentioned known cone-coupling have been avoided in the freewheel hub disclosed in the United States patent specification 2,800,986, in which one cone-surface is provided with relatively sharp teeth and the other cone-surface with very low saw-shaped teeth. The sharp teeth easily penetrate the oil film and they have a correcting effect on the saw-shaped teeth. However, it has appeared that sometimes the sharp teeth are apt to bite into the inoperative flanks of the saw-shaped teeth during driving of the cycle due to the self-braking slope of the latter teeth and that when on the pedals a somewhat greater force is exerted the coupling may slip till the operative flanks of the cooperating teeth engage each other. Owing thereto the cyclist may experience a little shock giving him the impression that the coupling slips, which is not true but may be annoying.

The invention has for its object to avoid the disadvantages of the mentioned known cone-couplings for freewheel hubs. It consists in that the number of teeth of one conical surface is an integer multiple of the number of teeth of the other conical surface and the teeth of the first mentioned conical surface have a height of 0.008″ (0.2 mm.) at the most, preferably less than 0.004″ (0.1 mm.). Consequently, in this cone-coupling one cone-surface is provided with the great number of very low saw-shaped teeth of the cone-coupling disclosed by the U.S. specification 2,800,986 and the other cone-surface is provided with a smaller number of higher saw-shaped teeth as used in the cone-coupling described in the British specification 202,319.

It has been found that owing to the said combination of different saw-shaped teeth during the coupling operation the oil film is well broken through and the greater saw-shaped teeth are not apt any more to bite into the inoperative flanks of the smaller saw-shaped teeth, so that the different teeth engage each other immediately with their operative flanks without rattling, shocks or other disturbing phenomena.

The effect of breaking through the oil film may be increased, if the chord of the inoperative flank of the teeth of the second conical-surface and the tangent are made to enclose an angle which is a few degrees, say 7°, larger than the angle enclosed by said tangent and the chord of the inoperative flank of the teeth of the first conical-surface. This small difference of the slopes of the inoperative flanks of the teeth when approaching each other appears not to increase the danger of the teeth of the second cone-surface biting into the inoperative flanks of the teeth of the first cone-surface and facilitates the discharge of oil towards the spaces between the teeth lying behind.

In order to improve the engagement of the cooperating teeth of the cone-coupling the small teeth of the first conical surface may be provided with a thin hardened surface layer, which smoothens the flanks of said teeth but still permits them to be corrected by the pressure exerted by the teeth of the other conical surface.

For the elucidation of the invention reference is made to the accompanying drawing, in which:

FIG. 1 shows partially an elevational view, partially a longitudinal sectional view of the upper half of a back-pedalling brake and freewheel hub according to the invention, FIG. 2 illustrates a front view of a coupling ring used in the hub shown in FIG. 1 and FIG. 3 is on a larger scale a cross sectional view of a portion of a clutching member and said coupling ring during engagement.

In the drawing 1 designates a wheel hub having flanges 2 and 3 for the connection of the spokes of the rear wheel of a bicycle. At the right hand end the wheel hub is supported by means of a steel ball race 4 and balls 5 on a driving member 6, which in its turn is supported by balls 7 on an axially adjustable cone 8 fixed by means of a nut 9. The driving member 6 is provided with a sprocket wheel 10 connected by means of a chain with the crank shaft of the bicycle and said member rotates about the stationary shaft 11 of the hub. The inner end portion of the driving member is provided with a screw thread 12 and supports thereon a clutching member 13, which is adapted to be inserted with its conical coupling surface 13a into a conical recess or counter conical surface 14a of a coupling ring 14. This coupling ring has a hexagonal periphery (FIG. 2) and fits in a throughgoing central boring of the wheel hub 1, said boring having also a hexagonal cross section. A friction spring 15 acts on the clutching member 13 and is supported by a pressure ring 16 of a multiple disk brake 17, 18 arranged within the wheel hub 1. This pressure ring is able to move in axial direction but held against rotation with regard to the shaft 11. It abuts against the driving member 6.

The end surface of the clutching member facing the pressure ring is provided with teeth 19 adapted to be brought into engagement with teeth 20 of the pressure ring 16. The other end of the wheel hub 1 rests by means of a ball-bearing (not visible) on the shaft 11. With the aid of a strip 21 the shaft 11 is held against rotation.

When the driving member 6 is rotated in forward direction by means of the crank shaft of the bicycle the clutching member 13 is screwed to the right and thus establishes the coupling between the driving member 6 and the wheel hub 1 through the coupling ring 14.

In order to prevent the cooperating conical surfaces 13a and 14a from slipping the cone-surface 13a is provided with saw-shaped teeth 13b, whereas the counter cone-surface 14a is provided beforehand by means of special tools with saw-shaped teeth 14b, of which the operative flanks have the same slope as the operative flanks of the teeth 13b.

The number of teeth 14b is an integer multiple of the number of teeth 13b. The teeth 14b have a height of 0.008" (0.2 mm.) at the most. It is sometimes sufficient to give said teeth a height of 0.0016" (0.04 mm.) in order to guarantee a tight coupling between the parts 13 and 14. The height of said teeth depends apparently on the number thereof. In the present case the hexagonal coupling ring 14 may be provided with 160 teeth and the clutching member 13 with 40 teeth.

In order to secure a good engagement of the teeth during the coupling operation the angle $a$ enclosed between the inoperative flank of a tooth 14b and the tangent to the cone-surface is made a few degrees, say 7°, smaller than the angle $b$ enclosed between the inoperative flank of a tooth 13b and said tangent. The slope of said inoperative flanks is assumed to be determined by the chords of said flanks if they are, as usual, a little bit curved. Said flanks may also be straight.

The cone-surface 13a and the teeth 13b are of very hard material. The counter cone-surface 14a of the coupling ring 14 may be made of softer material. However, it may be provided with a very thin hardened layer which improves the smoothness of the flanks.

It will be obvious, that the coupling ring 14 may be provided with a smaller number of bigger teeth 13b and the clutching member 13 with a greater number of smaller teeth 14b.

What I claim is:

1. A freewheel hub for a cycle wheel comprising in combination a rotatable driving member, a screw thread provided on said member, two cooperating conical surfaces constituting together a cone-coupling, a wheel hub associated with one part of said coupling, a clutching member associated with the other part of said coupling and adapted to be axially reciprocated by said screw thread and thereby to establish and to disconnect the coupling between said driving member and said wheel hub, both conical surfaces of said cone-coupling being provided with saw-shaped teeth, of which the operative flanks have equal slopes, the number of teeth of one conical surface being an integer multiple of the number of teeth of the other conical surface and the tangent to the inoperative flank of a tooth of the latter conical surface in the top point of said tooth enclosing with the tangent to the inoperative flank of a tooth of the first mentioned conical surface in any momentary joint of contact between the two concerned teeth a small angle.

2. A hub for a cycle wheel as in claim 1 wherein said small angle is approximately 7 degrees.

3. A freewheel hub for a cycle wheel comprising in combination a rotatable driving member, a screw thread provided on said member, two cooperating conical surfaces constituting together a cone-coupling, a wheel hub associated with one part of said coupling, a clutching member associated with the other part of said coupling and engaged with and to be axially reciprocated by said screw thread thereby to establish and to disconnect the coupling between said driving member and said wheel hub, both conical surfaces of said cone-coupling being provided with saw-shaped teeth, of which the operative flanks have equal slopes with the tangent to the inoperative flank of a tooth of one conical surface in the top point of said tooth enclosing with the tangent to the inoperative flank of a tooth of the other conical surface in any momentary joint of contact between the two concerned teeth a small angle, the height of the teeth of said one conical surface being at most .008 inch.

4. The combination of claim 3 wherein the height of the teeth of said one conical surface is less than .004 inch.

5. The combination of claim 4 wherein said small angle is approximately 7 degrees.

References Cited in the file of this patent

UNITED STATES PATENTS

| | | |
|---|---|---|
| 404,490 | King | June 4, 1889 |
| 656,549 | Kennedy | Aug. 21, 1900 |
| 863,425 | Newton et al. | Aug. 13, 1907 |
| 1,341,983 | Hughes | June 1, 1920 |
| 1,404,604 | Hajek | Jan. 24, 1922 |
| 2,241,525 | Roes | May 13, 1941 |
| 2,800,986 | Plas | July 30, 1957 |

FOREIGN PATENTS

| | | |
|---|---|---|
| 334,575 | France | Oct. 28, 1903 |